US010828728B2

(12) United States Patent
Scott et al.

(10) Patent No.: US 10,828,728 B2
(45) Date of Patent: Nov. 10, 2020

(54) HOTWIRE DEPOSITION MATERIAL PROCESSING SYSTEM AND METHOD

(71) Applicant: ILLINOIS TOOL WORKS INC., Glenview, IL (US)

(72) Inventors: Kevin Michael Scott, Sherwood, WI (US); Richard Martin Hutchison, Iola, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/483,005

(22) Filed: Sep. 10, 2014

(65) Prior Publication Data

US 2015/0083702 A1 Mar. 26, 2015

Related U.S. Application Data

(60) Provisional application No. 61/883,094, filed on Sep. 26, 2013.

(51) Int. Cl.
*B23K 11/00* (2006.01)
*B23K 9/00* (2006.01)
(Continued)

(52) U.S. Cl.
CPC ............... *B23K 28/00* (2013.01); *B23K 9/04* (2013.01); *B23K 9/095* (2013.01); *B23K 9/0953* (2013.01);
(Continued)

(58) Field of Classification Search
CPC .......... B23K 28/00; B23K 9/04; B23K 9/095; B23K 9/0953; B23K 9/1006; B23K 9/124; B23K 9/125; B23K 9/28
(Continued)

(56) References Cited

U.S. PATENT DOCUMENTS 2,365,958 A    12/1944   Holslag
2,416,047 A    2/1947    Dolan
(Continued)

FOREIGN PATENT DOCUMENTS

CA    2072711    12/1992
CN    2181354    11/1994
(Continued)

OTHER PUBLICATIONS

International Search Report from PCT application No. PCT/US2013/073863 dated May 2, 2014, 15 pgs.
(Continued)

*Primary Examiner* — Sang Y Paik
(74) *Attorney, Agent, or Firm* — McAndrews, Held & Malloy, Ltd.

(57) ABSTRACT

A material processing system includes a power supply and a wire feeder to feed a wire electrode for a material processing operation. The enthalpy and/or temperature of a region of the tip of the electrode is maintained substantially constant via closed loop control. The control may be based upon regulation of current applied to the electrode. The control of the current may be based upon an electrode extension error. Wire feed speed may also be controlled to assist in maintaining a substantially constant enthalpy and/or temperature near the electrode tip.

19 Claims, 3 Drawing Sheets

(51) Int. Cl.
  *B23K 28/00* (2006.01)
  *B23K 9/04* (2006.01)
  *B23K 9/10* (2006.01)
  *B23K 9/28* (2006.01)
  *B23K 9/12* (2006.01)
  *B23K 9/095* (2006.01)

(52) U.S. Cl.
  CPC ............ *B23K 9/1006* (2013.01); *B23K 9/124* (2013.01); *B23K 9/125* (2013.01); *B23K 9/28* (2013.01)

(58) Field of Classification Search
  USPC ............ 219/121.48–121.59, 148, 136–137.2
  See application file for complete search history.

(56) References Cited

U.S. PATENT DOCUMENTS

| | | | |
|---|---|---|---|
| 3,288,982 A | 11/1966 | Haruyoshi | |
| 3,725,629 A | 4/1973 | Vickers | |
| 3,809,853 A | 5/1974 | Manz | |
| 3,849,871 A | 11/1974 | Kaunitz | |
| 3,946,349 A | 3/1976 | Haldeman | |
| 4,160,967 A | 7/1979 | Beech | |
| 4,188,419 A | 2/1980 | Detert | |
| 4,222,023 A | 9/1980 | Beech | |
| 4,426,565 A | 1/1984 | Rueter | |
| 4,447,703 A | 5/1984 | Stol | |
| 4,467,176 A * | 8/1984 | Mizuno | B23K 9/1093 219/130.5 |
| 4,493,971 A | 1/1985 | Nawa | |
| 4,531,040 A | 7/1985 | Nawa | |
| 4,536,634 A | 8/1985 | Nawa | |
| 4,546,234 A | 10/1985 | Ogasawara | |
| 4,570,048 A * | 2/1986 | Poole | H05H 1/3405 219/121.5 |
| 4,580,026 A | 4/1986 | Stol | |
| 4,628,182 A | 12/1986 | Hori | |
| 4,631,385 A | 12/1986 | Rothermel | |
| 4,667,083 A | 5/1987 | Stol | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A | 11/1990 | Martin | |
| 5,001,326 A | 3/1991 | Stava | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A * | 12/1993 | Hamamoto | B23K 9/0956 219/130.21 |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,526,561 A | 6/1996 | McGaffigan | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn | |
| 5,773,799 A | 6/1998 | Maxfield | |
| 5,783,799 A | 7/1998 | Geissler | |
| 5,844,193 A | 12/1998 | Nomura | |
| 5,963,022 A | 10/1999 | Buda | |
| 5,968,587 A | 10/1999 | Frankel | |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,090,067 A | 7/2000 | Carter | |
| 6,107,602 A | 8/2000 | Geissler | |
| 6,115,273 A | 9/2000 | Geissler | |
| 6,169,263 B1 | 1/2001 | Derby | |
| 6,204,476 B1 | 3/2001 | Reynolds | |
| 6,248,976 B1 | 6/2001 | Blankenship | |
| 6,265,688 B1 | 7/2001 | Lyshkow | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear | |
| 6,515,259 B1 | 2/2003 | Hsu | |
| 6,583,386 B1 | 6/2003 | Ivkovich | |
| 6,596,970 B2 | 7/2003 | Blankenship | |
| 6,624,388 B1 | 9/2003 | Blankenship | |
| 6,642,482 B2 | 11/2003 | Rappl | |
| 6,670,579 B2 | 12/2003 | Davidson | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,984,806 B2 | 1/2006 | Huismann | |
| 6,995,338 B2 * | 2/2006 | Hutchison | B23K 9/1062 219/130.21 |
| 7,002,103 B2 | 2/2006 | Holverson | |
| 7,129,443 B2 | 10/2006 | Davidson | |
| 7,145,101 B2 | 12/2006 | Tong | |
| 7,244,905 B2 | 7/2007 | Das | |
| 7,265,320 B2 | 9/2007 | Ou | |
| 7,304,269 B2 | 12/2007 | Fulmer | |
| 7,307,240 B2 | 12/2007 | Holverson | |
| 7,351,933 B2 | 4/2008 | Huismann | |
| 7,683,290 B2 | 3/2010 | Daniel | |
| 8,203,100 B2 | 6/2012 | Ueda | |
| 8,288,686 B2 | 10/2012 | Kaufman | |
| 8,487,215 B2 | 7/2013 | Holverson | |
| 9,403,231 B2 | 8/2016 | Hutchison | |
| 9,539,662 B2 | 1/2017 | Hutchison | |
| 2002/0008095 A1 | 1/2002 | Norrish | |
| 2002/0045970 A1 | 4/2002 | Krause | |
| 2002/0107825 A1 | 8/2002 | Manicke | |
| 2002/0117487 A1 | 8/2002 | Corby | |
| 2002/0117488 A1 | 8/2002 | Arndt | |
| 2003/0058149 A1 | 3/2003 | Jayadeva | |
| 2004/0010342 A1 | 1/2004 | Thelen | |
| 2004/0069759 A1 * | 4/2004 | Davidson | B23K 9/091 219/130.5 |
| 2004/0182828 A1 | 9/2004 | Schmidt | |
| 2004/0188404 A1 * | 9/2004 | Hutchison | B23K 9/1062 219/130.21 |
| 2004/0222204 A1 | 11/2004 | Hutchison | |
| 2004/0238511 A1 | 12/2004 | Matus | |
| 2005/0184039 A1 | 8/2005 | Stava | |
| 2005/0269306 A1 | 12/2005 | Fulmer | |
| 2006/0163229 A1 | 7/2006 | Hutchison | |
| 2007/0051711 A1 | 3/2007 | Kachline | |
| 2007/0084840 A1 | 4/2007 | Davidson | |
| 2007/0102407 A1 | 5/2007 | Uezono | |
| 2007/0170163 A1 | 7/2007 | Narayanan | |
| 2007/0235434 A1 | 10/2007 | Davidson | |
| 2007/0267394 A1 | 11/2007 | Beck | |
| 2008/0264916 A1 | 10/2008 | Nagano | |

(56) References Cited

U.S. PATENT DOCUMENTS

| | | |
|---|---|---|
| 2008/0264917 A1 | 10/2008 | White |
| 2008/0264923 A1 | 10/2008 | White |
| 2009/0026188 A1 | 1/2009 | Schorghuber |
| 2009/0173726 A1 | 7/2009 | Davidson |
| 2009/0313549 A1* | 12/2009 | Casner .......... B23K 9/0953 715/740 |
| 2010/0059493 A1 | 3/2010 | McAninch |
| 2010/0096373 A1 | 4/2010 | Hillen |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0297658 A1 | 8/2011 | Peters |
| 2011/0248007 A1 | 10/2011 | Takeda |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0264323 A1 | 10/2013 | Daniel |
| 2013/0270245 A1 | 10/2013 | Holverson |
| 2014/0021183 A1 | 1/2014 | Peters |
| 2014/0158669 A1 | 6/2014 | Davidson |
| 2014/0183176 A1 | 7/2014 | Hutchison |
| 2014/0217077 A1 | 8/2014 | Davidson |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0367370 A1 | 12/2014 | Hutchison |
| 2015/0001197 A1 | 1/2015 | Marschke |
| 2015/0105898 A1 | 4/2015 | Adams |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| DE | 2501928 | 7/1976 |
| DE | 19808383 | 9/1999 |
| EP | 0194045 | 9/1986 |
| EP | 0387223 | 9/1990 |
| EP | 1036627 A2 | 9/2000 |
| EP | 1036627 A3 | 9/2000 |
| EP | 1232825 | 8/2002 |
| EP | 2218537 | 8/2010 |
| EP | 2286949 | 2/2011 |
| FR | 1443701 | 6/1966 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |

OTHER PUBLICATIONS

International Search Report from PCT Application No. PCT/US2014/055529, dated Mar. 6, 2015, 9 pgs.

International Search Report from PCT application No. PCT/US2014/014241 dated May 9, 2014, 8 pgs.

"ALT 304," Miller—The Power of Blue, Jun. 2001.

"Maxstar 200 SD, DX, and LX," Miller Electric Mfg. Co., Oct. 2003.

Bondy et al., "Graph Theory with Appliations," University of Waterloo, 1976, p. 7-8.

Canadian Office Action Appln No. 2,866,128 dated Dec. 8, 2017 (4 pgs).

European Communication Appln No. 14780932.1 dated Aug. 2, 2018 (3 pgs).

* cited by examiner

HOTWIRE DEPOSITION MATERIAL PROCESSING SYSTEM AND METHOD

BACKGROUND

The invention relates generally to welders, and more particularly to a welder configured to perform a preheating operation on an electrode material prior to execution of a material processing operation.

A wide range of material processing systems and material processing control regimes have been implemented for various purposes. In continuous material processing operations, gas metal arc material processing (GMAW) techniques, and a particular class referred to as metal inert gas (MIG) techniques allow for formation of a continuing weld bead by feeding material processing wire shielded by inert gas from a material processing torch. Electrical power is applied to the material processing wire and a circuit is completed through the workpiece to sustain an arc that melts the wire and the workpiece to form the desired weld. In related techniques, a flux cored wire may be used without a shielding gas.

Advanced forms of MIG material processing are based upon generation of pulsed power in the material processing power supply. That is, various pulsed regimes may be carried out in which current and/or voltage pulses are commanded by the power supply control circuitry to regulate the formation and deposition of metal droplets from the material processing wire, to sustain a desired heating and cooling profile of the weld pool, to control shorting between the wire and the weld pool, and so forth. However other material processing regimes exist and are commonly used that provide power that is not pulsed. The various regimes may rely on "electrode positive" or "electrode negative" polarities, and the present disclosure may relate to any and all of these.

In some metal material processing applications, joints may be made by so-called "hotwire" processes. In these, an electrode material is heated, but no arc is generally formed between the material and the workpiece. A heat source is then utilized to melt and fuse the materials. Such heat sources may include, for example, lasers, electron beams, GMAW heat sources, and so forth.

While very effective in many applications, traditional control methodologies are generally inadequate for hotwire processes. For example, traditional regulation schemes ("constant current" or "CC", and "constant voltage" or "CV") cannot maintain a desired electrode wire temperature because the control feedback variable does not necessarily correlate directly to enthalpy. In particular, in a hotwire process running in steady state, increasing the electrode extension will increase to voltage dropped across that region of the system. In a CV control scheme, the machine will react by decreasing current to maintain the set voltage. This lowers the enthalpy at the end of the wire. With a CC scheme the power supply maintains the set current while allowing the voltage to float. If electrode extension were increased, the wire enthalpy would increase.

There is a need, therefore, for specialized hotwire strategies that allow for direct control over critical process parameters.

BRIEF DESCRIPTION

The present disclosure relates to methods and systems designed to respond to such needs. In accordance with certain aspects, a material processing method comprises advancing an electrode to a workpiece to initiate a material processing operation, and regulating enthalpy of an end of an extension of the electrode during the material processing operation.

In accordance with another aspect of the disclosure, a material processing method includes advancing an electrode to a workpiece to initiate a material processing operation, and regulating current applied to the electrode to regulate enthalpy and/or temperature of an end of an extension of the electrode during the material processing operation.

The disclosure also provides for a material processing system that comprises a power supply configured to provide power for a material processing operation, a wire electrode feeder configured to advance a wire electrode during the material processing operation, and a control system configured to regulate enthalpy of an end of an extension of the electrode during the material processing operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
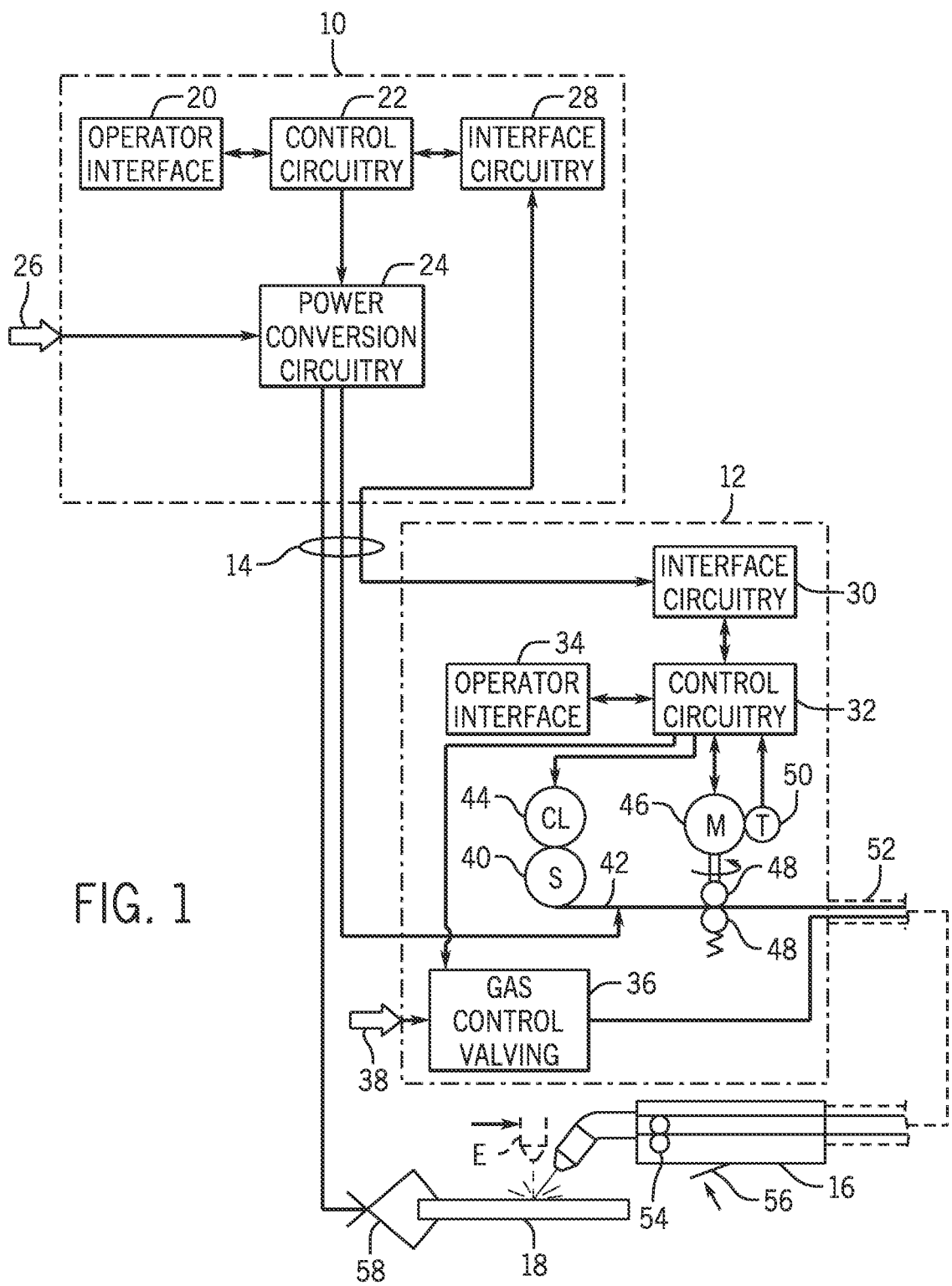
FIG. 1 is a diagrammatical representation of an exemplary material processing system illustrating a power supply coupled to a wire feeder for performing material processing operations in which an electrode is heated prior to weld initiation.

Turning now to the drawings, and referring first to FIG. 1, an exemplary material processing system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a material processing location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and in some embodiments shielding gas to a material processing torch 16. As will be appreciated by those skilled in the art, the material processing torch may be of many different types, and typically allows for the feed of a material processing wire and gas to a location adjacent to a workpiece 18 where a weld or cladding is to be formed to join or clad two or more pieces of metal. A second conductor is typically run to the material processing workpiece so as to complete an electrical circuit between the power supply and the workpiece.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for material processing with various materials including steels, stainless steels, nickel-based alloys or other material processing wire that is channeled through the torch. These weld settings are communicated to control circuitry 22 within the power supply.

The control circuitry, described in greater detail below, operates to control material processing current that is applied to the material processing wire for carrying out the desired material processing operation. In certain presently contemplated embodiments, for example, the control circuitry may be adapted to regulate the heating of the material processing electrode and for maintaining the enthalpy and/or temperature of the electrode during material processing. As described more fully below, such heating may be controlled by altering operating parameters such as of current and/or wire feed speed, for example applied to the electrode through the material processing cable and torch.

The control circuitry is thus coupled to power conversion circuitry 24. This power conversion circuitry is adapted to create the output power, such as pulsed and non-pulsed waveforms that will ultimately be applied to the material processing wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more material processing parameters, particularly wire feed speed. The operator interface may also allow for selection of such parameters as the process, the type of wire utilized, and so forth. The control circuitry 32 can also be coupled to gas control valving 36 which regulates the flow of shielding gas to the torch. In general, such gas is provided at the time of material processing, and its flow may be initiated immediately preceding the weld and for a short time following the weld. The gas applied to the gas control valving 36 is typically provided in the form of pressurized bottles, as represented by reference numeral 38.

The wire feeder 12 includes components for feeding wire to the material processing torch and thereby to the material processing application, under the control of control circuitry 36. For example, one or more spools of material processing wire 40 are housed in the wire feeder. Material processing wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 36, such as for calibration as described below.

It should be noted that other system arrangements and input schemes may also be implemented. For example, the material processing wire may be fed from a bulk storage container (e.g., a drum) or from one or more spools outside of the wire feeder. Similarly, the wire may be fed from a "spool gun" in which the spool is mounted on or near the material processing torch or fed via push/pull or push/push type mechanisms. As noted herein, the wire feed speed settings may be input via the operator input 34 on the wire feeder or on the operator interface 20 of the power supply, or both. In systems having wire feed speed adjustments on the material processing torch, this may be the input used for the setting.

Power from the power supply is applied to the wire, typically by means of a material processing cable 52 in a conventional manner. Similarly, shielding gas is fed through the wire feeder and the material processing cable 52. During material processing operations, the wire is advanced through the material processing cable jacket towards the torch 16. Within the torch, an additional pull motor 54 may be provided with an associated drive roller. The motor 54 is regulated to provide the desired wire feed speed as described more fully below. A trigger switch 56 on the torch provides a signal that is fed back to the wire feeder and therefrom back to the power supply to enable the material processing process to be started and stopped by the operator. It is noted that the process can be initiated by an operator or automated system, depending on how the process is implemented. That is, upon initiation of the process, gas flow is begun, wire is advanced, power is applied to the material processing cable 52 and through the torch to the advancing material processing wire. These processes are also described in greater detail below. Finally, a workpiece cable and clamp 58 allow for closing an electrical circuit from the power supply through the material processing torch, the electrode (wire), and the workpiece for maintaining the material processing operation.

It should be noted throughout the present discussion that while the wire feed speed may be "set" by the operator, the actual speed commanded by the control circuitry will typically vary during material processing for many reasons. For example, automated algorithms for "run in" (initial feed of wire for arc initiation) may use speeds derived from the set speed. Similarly, various ramped increases and decreases in wire feed speed may be commanded during material processing. Other material processing processes may call for "cratering" phases in which wire feed speed is altered to fill depressions following a weld. Still further, in pulsed material processing regimes, the wire feed speed may be altered periodically or cyclically.

Figure 2:
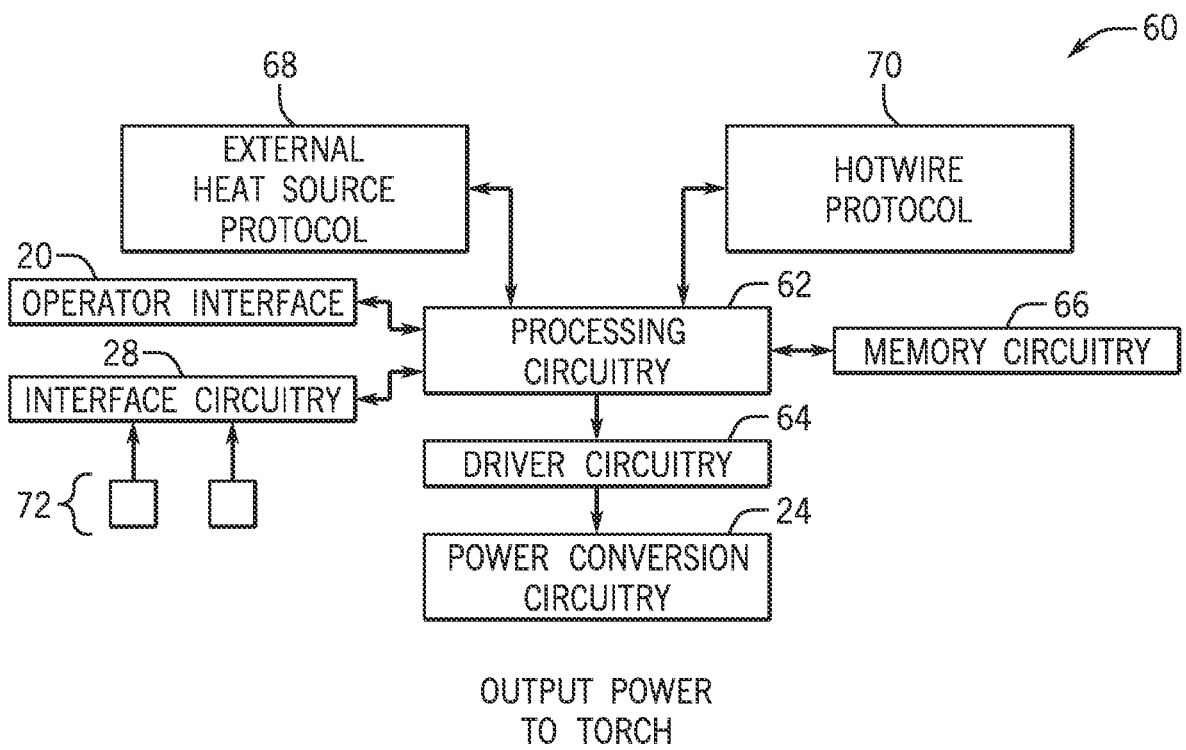
FIG. 2 is a diagrammatical representation of exemplary control circuitry components for a material processing power supply of the type shown in FIG. 1.

FIG. 2 illustrates an exemplary embodiment for the control circuitry 22 designed to function in a system of the type illustrated in FIG. 1. The overall circuitry, designated here by reference numeral 60, includes the operator interface 20 discussed above and interface circuitry 28 for communication of parameters to and from downstream components such as a wirefeeder, a material processing torch, and various sensors and/or actuators. The circuitry includes processing circuitry 62 which itself may comprise one or more application-specific or general purpose processors, designed to carry out material processing regimes, make computations for waveforms implemented in material processing regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for material processing regimes. The processing circuitry 62 will also be associated with memory circuitry 66 which may consist of one or more types of permanent and temporary data storage, such as for providing the material processing regimes implemented, storing material processing parameters, storing process settings, storing error logs, and so forth.

In the hotwire system illustrated, an external power source provides heat for melting and fusing the electrode material and/or the workpiece in order to form a joint or cladding. This external power source, indicated by the letter E in FIG. 1, may be based on any of a range of available technologies, including lasers, electron beams, GMAW welding processes, and so forth. The present control techniques are not, however, intended to be limited to any particular type of power source or type of heating.

In the embodiment illustrated in FIG. 2, the scheme is implemented by programmed protocols implemented by the processing circuitry 62. That is, a material processing regime protocol may comprise any known or future developed material processing program, and may be used with various external heat sources and protocols, as indicted by reference numeral 68. A hotwire control protocol is provided that may always be used, or that may be used only when selected by an operator, as indicated by reference numeral 70. In practice, the protocol may be implemented and, where desired, carried out during the entire material processing operation. The waveforms generated based upon these protocols may result form software only, hardware, and/or firmware that is implemented by the processing circuitry and/or that forms part of the control and driver circuitry illustrated. The control protocol will generally make use of feedback from sensors and inputs. These inputs may include weld settings, pre-programmed logic, and inputs from sensors 72 received during the material processing process. Sensed parameters will typically include, for example, current and voltage applied to the material processing torch, and there through, to the electrode.

Figure 3:
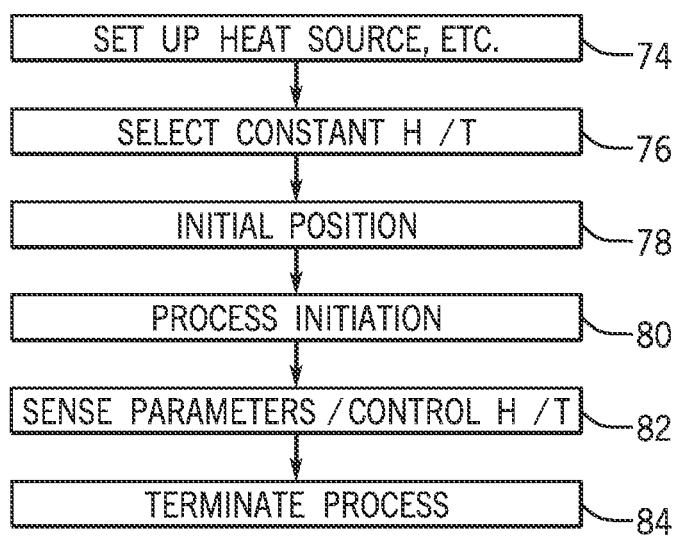
FIG. 3 is a flow chart illustrating exemplary steps in a process in which the enthalpy and/or temperature of the electrode is controlled during material processing.

FIG. 3 illustrates exemplary logic for implementation of the constant enthalpy or constant temperature material processing techniques. In a typical process, the material processing operator will make certain selections to define the material processing setup, the external heat source setup, and so forth, as indicated generally by reference numeral 74. Such selections may include a material processing wire feed speeds, trim value and so forth. The selections may be made on the power supply, on the wire feeder, or both. At step 76, where desired, the operator may select to perform the constant enthalpy or constant temperature material processing procedure described in the present disclosure. Moreover, while manual material processing systems are described, the same material processing processes may be performed in automated (e.g., robotic) systems.

At step 78, with the workpieces, cable, and other system components are ready to execute the desired process. At step 80, then, the process may be initiated. At this point, a cyclically repeated material processing control sequence is performed, as indicated at step 82. As described below, several scenarios may be envisaged for heating the electrode to a desired enthalpy or temperature level by control of one or more material processing parameters, such as current and/or wire feed speed. As indicated at step 84, the logic cycles during the material processing operation, with the system determining the appropriate current and/or wire feed speed (and any other controlled parameters), until the material processing operation is terminated, as indicated at step 84.

Figure 4:
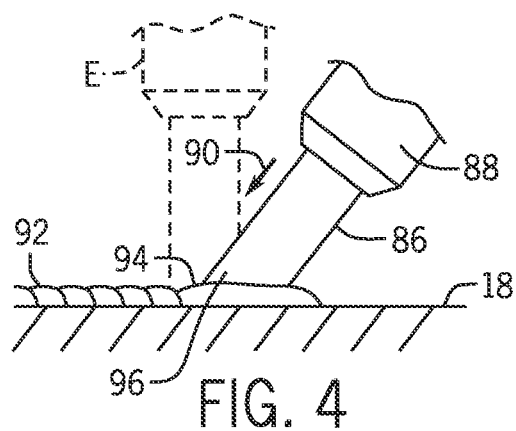
FIG. 4 is a detailed view of an electrode during material processing, where control is performed in accordance with the present disclosure.

FIG. 4 represents a material processing wire electrode 86 exiting a contact tip 88 of a material processing torch during material processing. The electrode 86 is consumed during the operation, and is thus caused to advance at a desired wire feed speed, as indicated by reference numeral 90. The bridge 92 is established between the electrode and the weld puddle 94, which will contain elements of the electrode, as well as of the workpieces that are fused during the material processing process. According to the present techniques, the tip 96 of the electrode, or more generally the vicinity of the tip, is maintained at a relatively constant enthalpy and/or temperature by the control disclosed. Such control is believed to enhance weld quality and consistency. A fusion joint or a cladding may be formed by the addition of heat by the external heat source E, which may operate under coordinated control with the hotwire control regime, or separately.

Figure 5:
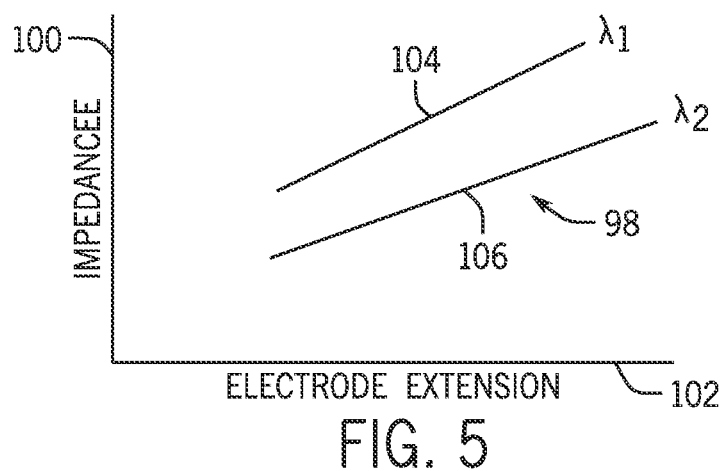
FIGS. 5 and 6 are illustrations of certain relationships relied upon during the control disclosed.

For a given wire at various wire feed speeds, the impedance at a desired wire enthalpy is generally linear with electrode extension from the contact tip. There is a subtle dependence on wire feed speed, but this dependence can generally be neglected for the present purposes. This relationship is shown in FIG. 5. In this figure, traces 98 relating electrode impedance 100 to electrode extension 102 are illustrated. The slope of these traces, for example, 104 and 106 for different wires, may be coined the "linear impedance", and has units of ohm/length, and is represented by the symbol λ. At a desired wire enthalpy, λ can be implemented in the following relationship:

$$EE * \lambda * I^2 = \left[\frac{\pi D_w^2}{4}\tau\rho_w\right][H_f - H_o] \qquad (1)$$

where EE is electrode extension (which may be computed during the process in accordance with known techniques), I is hotwire current (typically detected by one or more sensors), $D_w$ is the diameter of the material processing electrode (known based upon the selected wire electrode), r is the linear flow rate of the electrode material (the wire feed speed), $\rho_w$ the density of the electrode material at room temperature (also known based upon the selected wire electrode), $H_f$ is the final desired mass enthalpy of the electrode material and $H_o$ is the initial enthalpy of the electrode material (typically fixed for the process and electrode, with the initial enthalpy being conveniently assumed based upon estimated or sensed environmental temperature or temperature range).

Figure 6:
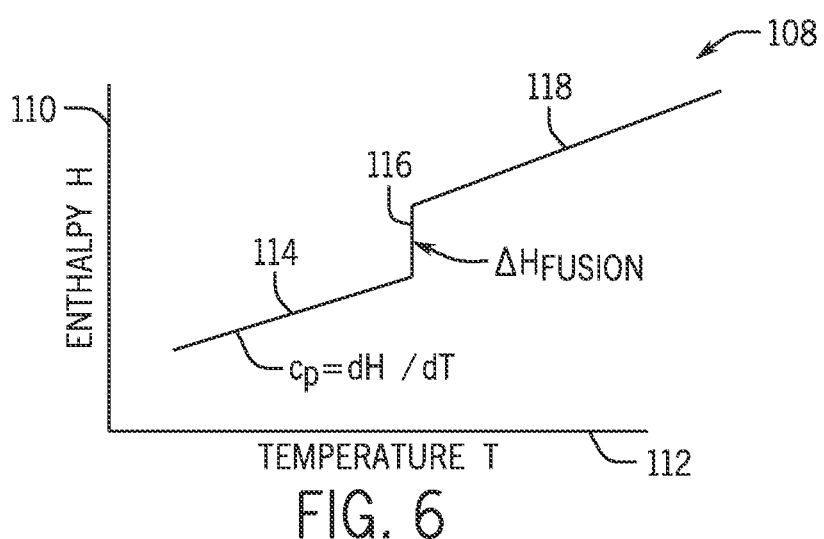

Moreover, enthalpy is related to temperature through the specific heat capacity, and is represented generally by FIG. 6. In this figure, the relationship 108 is illustrated between enthalpy H 110 at the end of the electrode, and the temperature T 112 at the same location. For many engineering alloys the relationship exhibits a generally linear portion 114 up to a fusion transition temperature 116, and then again becomes generally linear thereafter, as indicated by portion 118.

In the present context, control may be considered either constant enthalpy or constant temperature. However, the use of enthalpy rather than temperature is convenient because non-linearities of specific heat with temperature are inherently accounted for as well as solid state phase transformations that may occur. If temperature is to be defined rather than enthalpy, then the specific heat capacity as a function of temperature $[c_p(T)]$ will be known.

Equation 1 above can be re-written as:

$$EE_{ideal} = \frac{\pi D_w^2 \tau \rho_w (H_f - H_o)}{4\lambda I^2} \tag{2}$$

where I is feedback current from the process. Here again, this will be a sensed parameter, and sensors for this purpose may be provided at any convenient point in the system discussed above. Equation 2 is completely defined; therefore, setting an "ideal" electrode extension that is allowed to change by $I/I^2$. Equation 2 is compared to the instantaneous electrode extension given by:

$$EE_{actual} = \frac{(IV)_{feedback}}{I^2 \lambda} \tag{3}$$

$$= \frac{V_{fdbk}}{I_{fdbk}\lambda}$$

In a presently contemplated embodiment, an error is generated, multiplied by a gain factor and converted to a change in current:

$$(EE_{actual} - EE_{ideal})k_p = \Delta I \tag{4}$$

$$= \varepsilon_{EE} k_p \tag{5}$$

$$= \Delta I$$

Equations 4 and 5 represent only a proportional gain, but an integral and/or derivative gain (or any combination) could additionally be implemented based on the same error to accommodate for relative changes in $\tau$. This methodology allows for wire enthalpy to remain approximately constant independent of electrode extension changes. Thus, the control implemented to obtain the desired enthalpy may be based upon regulation of current applied to the wire electrode. It should be noted that wire feed speed may also be regulated to aid in maintaining the desired enthalpy and/or temperature.

It may be noted that the ideal wire enthalpy does not account for voltage drops across resistive contacts or secondary cabling. It may be desirable to compensate for this by adding a "trim" term to the calculated wire enthalpy. This is a dimensionless scalar that changes the calculated enthalpy by a pre-determined fraction based on actual system conditions. The "trim" can be changed while processing by an operator to compensate for uncertainty in the above mentioned variables. In currently contemplated implementations, the remainder of the control is set based upon the known characteristics of the wire electrode used (e.g., physical size, material, etc.).

As noted above, various types of gain may be employed that relate the electrode extension to applied welding power current, and that determine the desired current to maintain the desired enthalpy change. These might include linear gains, proportional gains, integral and derivative gains, combinations of these, and so forth. In a presently contemplated embodiment, a non-linear relationship may be established, as follows. In particular, the relationship between the electrode extension and the desired enthalpy change expressed above as equation 1 may be refined to isolate current as follows:

$$I^2 = \frac{\pi D_w^2 \tau \rho_w (H_f - H_o)}{4\lambda EE} \tag{6}$$

$$I = \left[\frac{\pi D_w^2 \tau \rho_w (H_f - H_o)}{4\lambda EE}\right]^{1/2} \tag{7}$$

$$I = \left[\frac{K}{EE}\right]^{1/2}. \tag{8}$$

The term K groups the generally constant terms together, including the wire electrode properties and the wire feed speed, as well as the target enthalpy change. The rate of change of current, as a function of electrode extension, may then be expressed:

$$\frac{dI}{dEE} = -1 \Big/ 2\left[\frac{K}{EE}\right]^{-1/2}\left[\frac{K}{EE^2}\right], \tag{9}$$

and solving for the current differential:

$$dI = -\left[\frac{K^*}{EE^{3/2}}\right] dEE \tag{10}$$

$$dI = -K^*\left[\frac{\lambda I_i}{V_i}\right]^{3/2}\left[EE_{ideal} - \frac{V_1}{\lambda I_i}\right]. \tag{11}$$

As can be seen, the rate of change of welding current, in this embodiment, is related to the electrode extension in a non-linear manner. It is believed that current control based on such relationships may provide better performance and accurately maintain the desired enthalpy change.

It should be noted that in the preferred embodiment, the regulated end of wire 86 is heated to a temperature just at or slightly below the melting temperature of the electrode material. A secondary heat source would be implemented to complete the melting of electrode 86 while fusing the material to part 18 in a controlled fashion. The secondary heat source can be GMAW, GTAW, plasma, laser, electron beam, etc.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A material processing method, comprising:
   advancing an electrode toward a workpiece via a material processing torch to initiate a hotwire process;
   measuring enthalpy of the electrode;
   regulating enthalpy of the electrode during the hotwire process to maintain a desired first rate of enthalpy change of the electrode using a first linear relationship between a temperature of the electrode and the enthalpy;
   determining a fusion transition temperature of the electrode based on a second rate of enthalpy change of the electrode using a second linear relationship between the temperature of the electrode and the enthalpy; and
   regulating the enthalpy of the electrode to maintain a desired third rate of enthalpy change of the electrode using a third linear relationship between the temperature of the electrode and the enthalpy above the fusion transition temperature of the electrode,
   wherein the enthalpy is regulated by regulating current applied to the electrode based in part upon the determined fusion transition temperature or a determined electrode extension error.

2. The method of claim 1, wherein the current is regulated based upon a proportional gain value.

3. The method of claim 1, wherein the enthalpy is controlled to maintain a generally constant enthalpy of the electrode.

4. The method of claim 1, wherein the enthalpy is controlled based upon known characteristics of the electrode selected for the hotwire process.

5. The method of claim 4, wherein the characteristics are determined based upon an operator input of the selected electrode into a system power supply and/or a wire feeder.

6. The method of claim 1, wherein the enthalpy is controlled based at least in part upon the relationship:

$$EE*\lambda*I^2=((\pi(D_w)^2\tau\rho_w)/4)*(H_f-H_o)),$$

wherein EE is electrode extension, I is material processing current, $D_w$ is the diameter of the electrode, $\tau$ is linear flow rate of the electrode, $\rho_w$ the density of the electrode at a known temperature, $H_f$ is a desired enthalpy of the electrode and $H_o$ is an initial enthalpy of the electrode.

7. The method of claim 1, wherein a wire feed speed of the electrode is regulated based upon the determined electrode extension error.

8. The system of claim 1, wherein the electrode extension error is determined by comparing an actual electrode extension ($EE_{actual}$) with an ideal electrode extension ($EE_{ideal}$), wherein:

$$EE_{actual}=((IV)_{feedback})/(I^2\lambda), \text{ and}$$

$$EE_{ideal}=(\pi(D_w)^2\tau\rho_w(H_f-H_o))/(4I^2\lambda),$$

where $EE_{actual}$ is an actual electrode extension, $EE_{ideal}$ is an ideal electrode extension, $(IV)_{feedback}$ is feedback of voltage and current, I is material processing current, $\lambda$ is linear impedance in units of ohm/length, $D_w$ is the diameter of the electrode, $\tau$ is linear flow rate of the electrode, $\rho_w$ is the density of the electrode at a known temperature, $H_f$ is a desired enthalpy of the electrode and $H_o$ is an initial enthalpy of the electrode.

9. The system of claim 8, wherein the regulated current is controlled at least in part by: $\Delta I=(EE_{actual}-EE_{ideal})k_p$, wherein $k_p$ is a gain factor.

10. A material processing method, comprising:
    advancing an electrode toward a workpiece via a material processing torch to initiate a hotwire process;
    during the hotwire process, heating the electrode at a first location using a heat source external to the material processing torch;
    measuring enthalpy of the electrode;
    regulating enthalpy of the electrode by regulating a wire feed speed of the electrode using a first linear relationship between a temperature of the electrode and the enthalpy;
    determining a fusion transition temperature of the electrode based on a second rate of enthalpy change of the electrode using a second linear relationship between the temperature of the electrode; and
    regulating the enthalpy of the electrode by regulating the wire feed speed of the electrode to maintain a desired third rate of enthalpy change of the electrode using a third linear relationship between the temperature of the electrode and the enthalpy above the fusion transition temperature of the electrode.

11. The method of claim 10, wherein a wire feed speed of the electrode is regulated based upon the determined electrode extension error.

12. The method of claim 10, wherein the temperature is controlled to maintain a generally constant temperature of the region of the electrode.

13. The method of claim 10, wherein the temperature is controlled based upon known characteristics of the electrode selected for the hotwire process.

14. The method of claim 13, wherein the characteristics are determined based upon an operator input of the selected electrode into a system power supply and/or a wire feeder.

15. A material processing system comprising:
    a power supply configured to provide power for a hotwire process;
    a wire electrode feeder configured to advance a wire electrode during the hotwire process; and
    a control system configured to:
        measure enthalpy of the electrode;
        regulate enthalpy of the wire electrode during the hotwire process to maintain a desired first rate of enthalpy change of the electrode using a first linear relationship between a temperature of the electrode and the enthalpy;
        determine a fusion transition temperature of the electrode based on a second rate of enthalpy change of the electrode using a second linear relationship between the temperature of the electrode and the enthalpy;
        regulate the enthalpy of the electrode to maintain a desired third rate of enthalpy change of the electrode using a third linear relationship between the temperature of the electrode and the enthalpy above the fusion transition temperature of the electrode; and regulate the enthalpy by regulating a current applied to the electrode based in part upon the determined fusion transition temperature or a determined electrode extension error.

16. The system of claim 15, comprising a current sensor connected to detect current applied to the wire electrode, wherein the control system is configured to regulate enthalpy by regulating current applied to the wire electrode based upon feedback from the current sensor.

17. The system of claim 15, wherein the current is regulated based upon a proportional gain value.

18. The system of claim 15, wherein the enthalpy is controlled to maintain a generally constant enthalpy of the wire electrode.

19. The system of claim 15, wherein a wire feed speed of the electrode is regulated based upon the determined electrode extension error.

\* \* \* \* \*